Patented Apr. 28, 1936

2,039,112

UNITED STATES PATENT OFFICE 2,039,112

PURIFICATION OF RUBBER DISTILLATES

Francis Norman Pickett, Westminster, London, England, assignor to United States Rubber Products, Inc., New York, N. Y., a corporation of Delaware No Drawing. Application October 11, 1935, Serial No. 44,557. In Great Britain November 6, 1934

4 Claims. (Cl. 260—1)

This invention relates to the art of preparing solvents of organic origin and has for its object to provide an improved method for preparing and deodorizing solvents of this nature.

It is known that the destructive distillation of rubber preferably waste rubber, produces a liquid of low viscosity that has valuable solvent properties.

Certain fractions of the said distillate which are substantially isoprene-free may for instance be used in the reclamation or devulcanization of waste rubber whilst crude rubber may be dissolved in the same or other fractions, as set forth in my co-pending application Ser. No. 721,760 filed April 21, 1934, wherein it is described that the destructive distillation of the rubber produces a "cracking" effect on the heavier oils with the result that the distillate contains besides isoprene, an increased proportion of more volatile or light oils.

One disadvantage in the use of the distillate of rubber as a solvent has been the characteristic unpleasant odor of the liquid, whilst its color is unattractive.

By cracking, deodorizing and decolorizing the distillate I produce a general purpose solvent of considerable use in industry.

It will be found that most ordinary organic substances are soluble in such a solvent and that it will mix readily with most organic liquids.

The lighter fractions, being more spiritous than oily in nature may be used for such purposes as dry cleaning and de-greasing.

For toilet purposes the solvent, unlike petrol benzine and similar solvents will remove grease and oil from the skin without leaving it dry and scaly.

Wax readily dissolves in the solvent and wax polishes may thus be prepared with the solvent as a substitute for the more usual turpentine, or the solvent may be used in admixture with turpentine for any of the more usual purposes to which turpentine is put.

By rectification, the flash point of the solvent may be adjusted to any reasonable degree.

In carrying the invention into effect, rubber preferably waste vulcanized rubber is subjected to dry destructive distillation in a closed retort. The distillate is a heavy dark colored oil having a strong penetrating smell.

After this oil has been freed from water it is dealt with in the following manner.

By fractional distillation of the rubber distillate, the fraction which distils over up to about 200° C. is collected, whilst the residue is used in connection with reclaiming rubber.

The light fraction referred to distilling up to about 200° C. is found to possess a somewhat unpleasant odor, whilst its color is dark and unattractive for a general purpose solvent.

In order to remove the odor and to improve the color the solvent is heated with a metallic chloride such as mercuric chloride, zinc chloride or ferric chloride, preferably in the form of a dry salt. The proportion of salt may be varied according to the degree of decolorization and deodorization desired. Generally 2% to 7% by weight may be used.

On re-distilling, the solvent is found to be deodorized and practically decolorized, the color being a light amber or straw color.

The treatment with chlorides may be carried out before the light fraction is separated from the distillate, and in this case the odor of the heavy residue is also improved. The use of zinc chloride is preferred on account of the fact that zinc oxide which is readily obtained as a by-product in the destructive distillation process of waste vulcanized rubber e. g. waste tire stocks, can be easily separated and converted into the chloride.

With the detailed description given above, it will be obvious that modifications will suggest themselves without departing from the principle of the invention, and it is not desired to limit the invention otherwise than as set forth in the appended claims.

Having thus described my invention, what I claim and desire to protect by Letters Patent is:

1. A process of preparing an organic solvent from rubber which comprises deodorizing and decolorizing a rubber distillate by heating the same in the presence of a metallic chloride selected from the group consisting of mercuric chloride, ferric chloride and zinc chloride, said rubber distillate corresponding to the fraction distilling over up to about 200° C.

2. A process of preparing an organic solvent from rubber which comprises subjecting the rubber to destructive distillation, fractionally distilling the rubber distillate, recovering the fraction distilling over up to about 200° C., heating said distillate fraction with a metallic chloride selected from the group consisting of mercuric chloride, ferric chloride and zinc chloride, said rubber distillate corresponding to the fraction distilling over up to about 200° C. to deodorize and decolorize the distillate, and separating the deodorized and decolorized distillate from metallic chloride.

3. A process of preparing an organic solvent from rubber which comprises deodorizing and decolorizing a rubber distillate by heating the same in the presence of zinc chloride selected from the group consisting of mercuric chloride, ferric chloride and zinc chloride, said rubber distillate corresponding to the fraction distilling over up to about 200° C.

4. An organic solvent derived from a process as set forth in claim 1 and characterized in having a light amber or straw color.

FRANCIS NORMAN PICKETT.